(12) United States Patent
Onbe et al.

(10) Patent No.: US 7,266,770 B2
(45) Date of Patent: Sep. 4, 2007

(54) INFORMATION PROCESSING TERMINAL THAT EQUATES DETECTED POSITION INFORMATION WITH USER-ENTERED POSITION INFORMATION

(75) Inventors: Takaaki Onbe, Hachioji (JP); Atsushi Shimizu, Moko (JP); Tanichi Ando, Kawasaki (JP); Naoya Yasugi, Nagaokakyo (JP); Nobuyuki Sakatani, Otsu (JP)

(73) Assignee: Omron Corporation, Kyoto-Shi (JP)

( * ) Notice: Subject to any disclaimer, the term of this patent is extended or adjusted under 35 U.S.C. 154(b) by 891 days.

(21) Appl. No.: 10/405,032

(22) Filed: Apr. 2, 2003

(65) Prior Publication Data
US 2003/0234807 A1 Dec. 25, 2003

(30) Foreign Application Priority Data
Apr. 3, 2002 (JP) ............................. 2002/101778

(51) Int. Cl.
*G06F 3/00* (2006.01)
(52) U.S. Cl. ........................................................ 715/702
(58) Field of Classification Search ................. 715/702
See application file for complete search history.

(56) References Cited

U.S. PATENT DOCUMENTS

| | | | | |
|---|---|---|---|---|
| 6,005,482 A | * | 12/1999 | Moran et al. ............. | 340/568.8 |
| 6,225,906 B1 | * | 5/2001 | Shore ...................... | 340/573.4 |
| 6,236,991 B1 | * | 5/2001 | Moran et al. ............... | 345/156 |
| 6,433,687 B1 | * | 8/2002 | Yamaashi et al. ......... | 340/573.1 |
| 2002/0135479 A1 | * | 9/2002 | Belcher et al. ........... | 340/572.1 |
| 2002/0163901 A1 | * | 11/2002 | Spratt ......................... | 370/338 |
| 2003/0101150 A1 | * | 5/2003 | Agnihotri et al. ............ | 706/45 |

* cited by examiner

*Primary Examiner*—Kristine Kincaid
*Assistant Examiner*—Le Nguyen
(74) *Attorney, Agent, or Firm*—Foley & Lardner LLP

(57) ABSTRACT

An information processing terminal, includes an inter-area movement detecting unit for detecting that a position of the information processing terminal is moved from one area to another area by detecting undulations, and an outputting unit for outputting a question to a user asking the position of the information processing terminal in response to the detection of inter-area movement by the inter-area movement detecting unit. The terminal also includes an answer recognizing unit for recognizing an answer by the user in response to the question output by the outputting unit, and an information sending unit for sending information recognized by the answer recognizing unit to an external apparatus.

20 Claims, 12 Drawing Sheets

INFORMATION PROCESSING TERMINAL THAT EQUATES DETECTED POSITION INFORMATION WITH USER-ENTERED POSITION INFORMATION

BACKGROUND OF THE INVENTION

1. Field of the Invention

The present invention relates to an information processing terminal, a server, an information processing program and a computer-readable recording medium storing the same, for providing information to an external apparatus and/or users by performing different kinds of information processing.

2. Description of the Related Art

Conventionally, a sensor system called a sensor field has been proposed. FIG. 12 is a conceptual diagram showing a construction of the conventional sensor field. As shown in FIG. 12, the sensor field includes a terminal 121 for receiving fixed information from an information tag 124 (sensor). The terminal 121 exchanges different kinds of information with an information processing server 123 over a network 122.

In other words, the terminal 121 has a function of providing information to users and a function of gathering information from the information tag 124. The terminal 121 gathers space-related information called fixed information from the information tag 124 and sends the information to the information processing server 123. On the other hand, the terminal 121 receives processed information (different kinds of information in accordance with the current position of the terminal 121) from the information processing server 123 and provides the information to users. The form of the terminal 121 may vary, such as a mobile telephone and a robot-type terminal.

In FIG. 12, the fixed information (space-related information) sent from the information tag 124 includes positional coordinate information and name information corresponding to positional coordinates, which are stored in the information tag 124. The fixed information is information given by a manager in advance. The fixed information (space-related information) may be in any form as long as the information can be stored in the information tag 124 in advance. The information tag 124 sends the fixed information (space-related information) in response to a request from the terminal 121.

In the sensor field, the fixed information (space-related information) desired by a user is provided from the information tag 124 to the terminal 121 only in timing instructed to the terminal 121 by the user. Then, the fixed information (space-related information) is sent to the information processing server 123. Therefore, the load of controlling the entire system is smaller than that of a system for continuously receiving the fixed information (space-related information) from the information tag 124 and for sending the information to the information processing server 123. Furthermore, the invasion of user's privacy due to the information supply more than necessary can be avoided advantageously.

However, the conventional sensor field has the following problems as discussed below.

In the sensor field, fixed information (space-related information) corresponding to the locations must be registered with respective information tags in advance. Therefore, when many information tags are provided, for example, when the implementation of an information supply service is attempted in a wide area, not only are the information tags provided, but also fixed information (space-related information) corresponding to the information tags must be registered. As a result, the registration work becomes extremely complicated.

Generally, the work of registering fixed information (space-related information) requires a high level of expertise. The information tag may be more easily provided at a place of a public nature and where an expert can easily be sent, such as a station and a street corner. On the other hand, providing an information tag is difficult in a place where sending an expert is difficult, such as a private place like an ordinary household.

For these reasons, the building of infrastructure, such as providing many information tags, is prevented. As a result, the spread of network service using the sensor field is delayed.

Also, when fixed information (space-related information) having been registered with an information tag once, needs to be changed or to be registered again, changing and re-registration are also complicated and difficult disadvantageously in the same manner as discussed above. For example, fixed information (space-related information) having been registered once, may need to be changed or re-registered when a station name registered as fixed information (space-related information) is subsequently changed.

Furthermore, general users are not familiar with most of the contents of fixed information (space-related information) registered with each of the information tags by an expert. In this case, network services cannot be provided to users by using familiar tone and/or general names to the users.

SUMMARY OF THE INVENTION

The present invention overcomes these problems discussed above. It is an object of the invention to provide an information processing terminal, a server, an information processing program and a computer-readable recording medium storing the same, for obtaining and/or using space-related information efficiently and naturally from a user without expertise.

According to one aspect of the invention, there is provided an information processing terminal, including an inter-area movement detecting unit for detecting that a position of the information processing terminal is moved from one area to anther area by detecting undulations, an outputting unit for outputting a question to a user asking the position of the information processing terminal in response to the detection of inter-area movement by the inter-area movement detecting unit, an answer recognizing unit for recognizing an answer by the user in response to the question output by the outputting unit, and an information sending unit for sending the information recognized by the answer recognizing unit to an external apparatus.

In one embodiment, the inter-area movement detecting unit analyzes the waveform, frequency and strength of a received wave. Thus, the information processing terminal can detect that the position of the information processing terminal is moved from an area A having a specific undulation state (including a no-undulation state) to an area B having a different undulation state. For example, the inter-area movement detecting unit may be a combination of a sending/receiving device for detecting undulations such as electromagnetic waves, infrared rays and ultrasound, and a driving circuit for identifying and/or analyzing detected waves.

The term, "area" here refers to an arbitrary space area identified by detecting the undulation. For example, the "area" may be each of multiple rooms sectioned and surrounded by walls for outputting undulations different from each other.

The outputting unit may output a voice message, such as "Where am I now?", asking the position of the terminal, and/or may display a message, "Enter current position" for asking the position of the terminal. For example, the outputting unit may be a combination of a speaker and/or display and a control device.

The answer recognizing unit may be a voice recognizing system for recognizing an answering voice of a user, or a keyboard for receiving input operations from a user. By using the answer recognizing unit, information can be obtained corresponding to the output by the outputting unit.

The information sending unit may be either wireless communication or wired communication. The wireless communication may use a short distance radio such as weak radio waves compliant with a wireless local area network (LAN) and/or Blue-Tooth (Registered Trademark), short distance radio such as a specific small power radio, optical radio, or short-distance infrared communication. The wired communication may use a LAN or a private line.

The form of the terminal is not limited in particular to a terminal having these specific units. The terminal may be a mobile telephone, a personal digital assistant (PDA), a personal computer, a pet-robot type terminal and other kinds of terminals.

In one embodiment, a movement of the terminal from one area A to a different area B is detected by the inter-area movement detecting unit based on a change in undulation state. The outputting unit outputs to a user a question asking the position of the terminal in response to the inter-area movement detection. In response to the output, the user answers by voice, or performs an input operation. The answer recognizing unit recognizes the contents of the answer. Furthermore, the information sending unit sends the recognized information to an external apparatus.

Thus, a user can provide space-related information (such as names and/or nicknames of areas) corresponding to the current position to an external apparatus merely by answering questions from the information processing terminal naturally without expertise and/or technical skills. Therefore, the external apparatus need not impose special system loads. The external apparatus need only receive and store, in the database, information transmitted from the information processing terminal. Thus, the external apparatus can obtain space related information. As a result, the external apparatus can handle changes in space-related information flexibly without a large load imposed on a user.

The information processing terminal and the external apparatus recognize natural answers from users to questions so that space-related information can be obtained in a user-friendly tone by using general names, for example. The external apparatus can guide evacuation in emergency by using area names familiar to users based on the space-related information. Therefore, a more effective network service can be provided.

The information sending unit may send a detection result by the inter-area movement detecting unit to the external apparatus in addition to the information recognized by the answer recognizing unit.

In one embodiment, the detection result by the inter-area movement detecting device may be information regarding waveforms, frequencies and strength of detected undulations in addition to the inter-area movement information.

In one embodiment, the external apparatus may receive the information and can obtain information regarding the current position of the information processing terminal comprehensively. As a result, the external apparatus can obtain these kinds of information in association. For example, the external apparatus can obtain and store a current coordinate position (space information) of the information processing terminal and recognition information (space-related information) in association with the space information. The current coordinate position is analyzed from a detected undulation. The recognition information is a nickname of the surrounding area.

The outputting unit may output voice.

In one embodiment, a question regarding a position of the information processing terminal from the information processing terminal to a user can be given in an extremely natural form. Therefore, the user can recognize the question without a feeling of being wrong. As a result, even small children can use the present information processing terminal.

The answer recognizing unit may recognize voice.

In one embodiment, the information processing terminal can recognize an answer given by a user, which is an extremely natural form to users. Therefore, the user can provide space related information easily in a friendly tone by using common names. As a result, even small children can use the present information processing terminal.

The undulations may be electromagnetic waves.

According to one embodiment, information tags in the form of electromagnetic wave transmitters may be adopted in various places so that the information processing terminal can detect an inter-area movement easily. Electromagnetic waves are generally wider in transmission range than that of infrared rays, for example. Therefore, the number of the provided information tags may be reduced and may be effectively provided.

The information processing terminal may further include a moving unit for moving from one area to the other.

In one embodiment, the information processing terminal can move from one area to the other by itself. Therefore, the processing information terminal can move from one area to the other and gather space-related information in accordance with an instruction from a user or spontaneously. For example, a pet-robot type terminal including a driving system having different kinds of motor as the moving unit may be adopted as the information processing terminal.

According to another aspect of the invention, there is provided a server including an information receiving portion for receiving information sent from the information processing terminal, an information processing portion for processing information received by the information receiving portion, and an information sending portion for sending information processed by the information processing portion to the information processing terminal.

In one embodiment, the information receiving portion receives space-related information and other information from the information processing terminal. Then, the information is stored and/or processed properly by using the function of the information processing portion. After that, the information sending portion sends the information processed by the information processing portion to the information processing terminal so that various kinds of information and network services can be provided to users of the information processing terminal.

A computer may be arranged to function as the information processing terminal.

Furthermore, the information processing program may be recorded in a computer-readable recording medium in advance. Then, the information processing program may be read and executed by a computer. Thus, the computer may be arranged to function as the server.

According to another aspect of the invention, there is provided an information processing method, including detecting that a position of an information processing terminal is moved from one area to another area by detecting undulations, outputting a question to a user asking the position of the information processing terminal in response to the detection step, recognizing an answer by the user to the question output in the outputting a question step, and sending information recognized at the answer recognizing an answer step.

In one embodiment, the inter-area movement detecting step analyzes the waveform, frequency and strength of a received wave. Thus, the information processing terminal can detect that the position of the information processing terminal is moved from an area A having a specific undulation state (including a no-undulation state) to an area B having a different undulation state. For example, the inter-area movement detecting step may perform processing for detecting undulations such as electromagnetic waves, infrared rays and ultrasound, and for identifying and/or analyzing detected waves.

The term, "area" here refers to an arbitrary space area identified by detecting the undulation. For example, the "area" may be each of multiple rooms sectioned and surrounded by walls for outputting undulations different from each other.

The outputting step may output a voice message, such as "Where am I now?", asking the position of the terminal and/or may display a message, "Enter current position" for asking the position of the terminal.

The answer recognizing step may perform processing for recognizing an answering voice of a user or receiving input operations from a user. By performing the answer recognizing step, information can be obtained corresponding to the output by the outputting step.

The information sending step may be performed by either wireless communication or wired communication. The wireless communication may use a short distance radio such as weak radio waves compliant with a wireless local area network (LAN) and/or Blue-Tooth (Registered Trademark), short distance radio such as a specific small power radio, optical radio, or short-distance infrared communication. The wired communication may use a LAN or a private line.

In one embodiment, a movement of the terminal from one area A to a different area B is detected by the inter-area movement detecting step based on a change in undulation state. The outputting step outputs to a user a question asking the position of the terminal in response to the inter-area movement detection. In response to the output, the user answers by voice, or performs an input operation. The answer recognizing step recognizes the contents of the answer. Furthermore, the information sending step sends the recognized information to an external apparatus.

Thus, a user can provide space-related information (such as names and/or nicknames of areas) corresponding to the current position to an external apparatus merely by answering questions from the information processing terminal naturally without expertise and/or technical skills. Therefore, the external apparatus need not impose special system loads. The external apparatus need only receive and store, in the database, information transmitted from the information processing terminal. Thus, the external apparatus can obtain space related information. As a result, the external apparatus can handle changes in space-related information flexibly without a large load imposed on a user.

The information processing terminal and the external apparatus recognize natural answers from users to questions so that space-related information can be obtained in a user-friendly tone by using general names, for example. The external apparatus can guide evacuation in emergency by using area names familiar to users based on the space-related information. Therefore, a more effective network service can be provided.

DESCRIPTION OF THE PREFERRED EMBODIMENTS

1. Outline of System Construction

A network service system according to an embodiment of the invention will be described with reference to the drawings.

Figure 2:
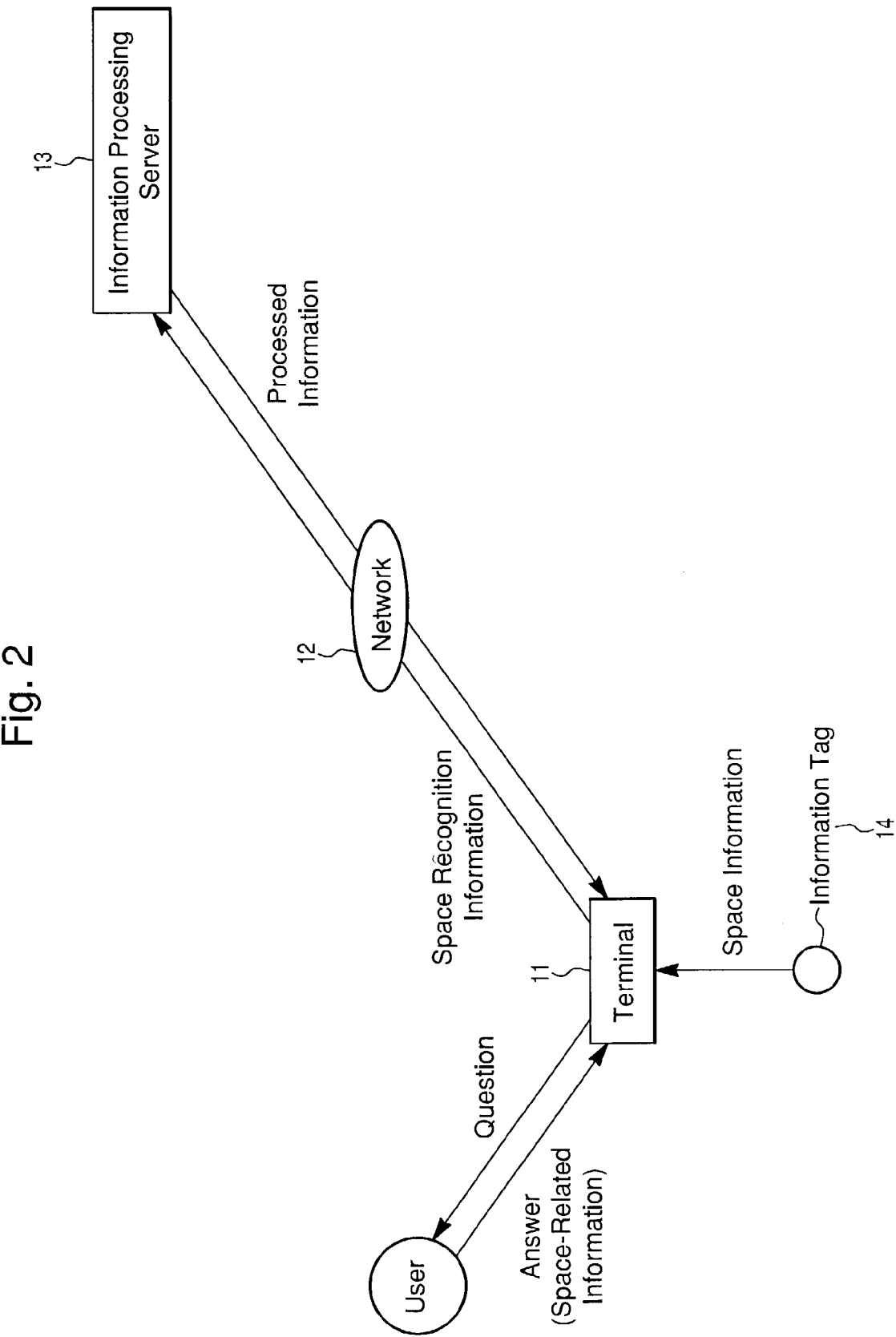
FIG. 2 is a conceptual diagram showing a construction of the network service system.

FIG. 2 is a conceptual diagram showing a construction of the network service system. As shown in FIG. 2, the network service system includes a terminal 11 (information processing terminal), a network 12, an information processing server 13 (external apparatus or server), and an information tag 14.

Each of the components will be described later. First of all, the terminal 11 will be described which is the information processing terminal of the invention. the terminal 11 receives "space information" from the information tag 14. Then, the terminal 11 asks a question to a user and recognizes the answer from the user as "space-related information". Then, the terminal 11 associates the space information and space-related information to create "space recognition information". Then, the terminal 11 sends the space recognition information to the information processing server 13 over the network 12. The question is not limited in expressing method, language and data form. The question only needs to ask a user a position of the terminal 11. The answer is also not limited in expressing method, language and data form. The answer only needs to be performed by the user.

After that, the information processing server 13 creates different kinds of processing information based on the received space recognition information. Then, the terminal 11 receives the different kinds of processing information over a network 12 again and provides them to the user in a proper form.

The form of the terminal 11 is not limited in particular in terms of the components of the terminal 11. The terminal 11 may be a mobile telephone, a personal digital assistant (PDA), a personal computer, a pet-robot type terminal and other kinds of terminals. In this embodiment, the terminal 11 is a pet-robot type terminal including, as a moving unit, a driving system having different kinds of motor. In this embodiment, the terminal 11 can move between predetermined areas by itself. Therefore, the terminal 11 can move between predetermined areas and gather space related information in accordance with an instruction from a user or spontaneously. A pet-robot type terminal, such as a dog robot, is adopted as the terminal 11 so that the reluctance of users with respect to the network service system of the invention can be reduced.

Figure 3:
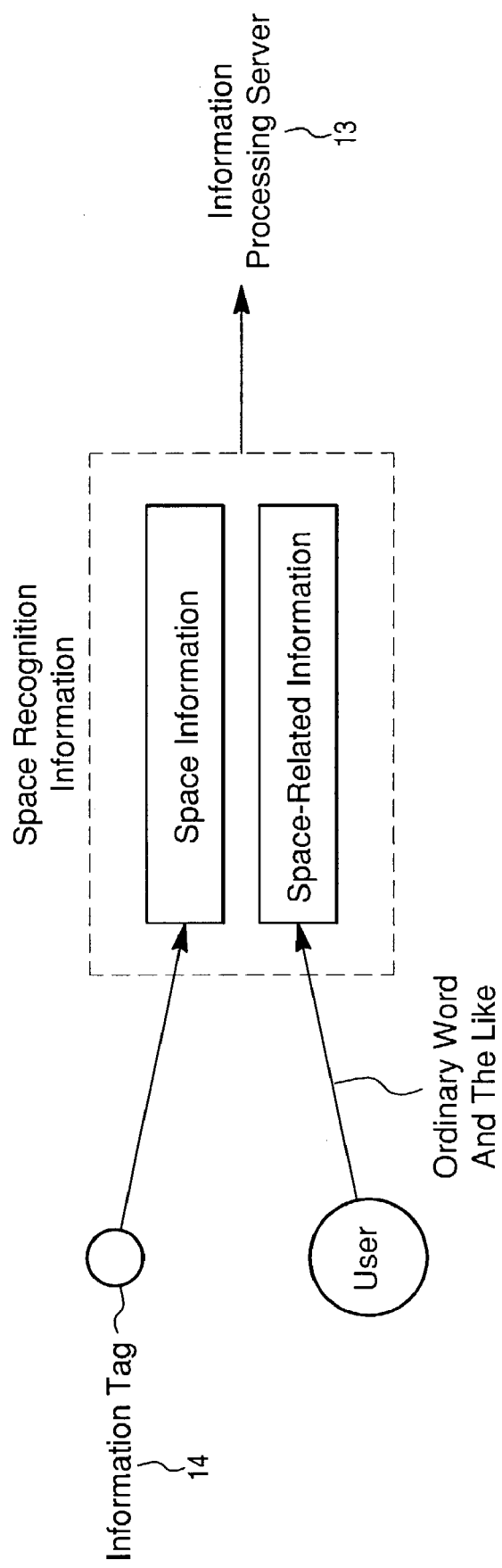
FIG. 3 is a model diagram showing a relationship among space information, space-related information and space-recognition information.

As shown in FIG. 3, the space recognition information includes space information provided from the information tag 14 and space-related information provided by a user. The space information and space-related information are associated with each other and are integrated in the space recognition information.

Here, the space information may be of any kinds as long as the space information can uniquely specify an area (space) where the terminal 11 positions. For example, the space information may be number/reference numeral information for identifying multiple information tags 14 or may be value information indicating positional coordinates of the terminal 11 and the nearest information tag 14.

The space-related information is general information (such as a name and/or nickname of an area) corresponding to the area (space) where the terminal 11 positions. The space-related information is provided by a user.

In FIGS. 2 and 3, the space information and the space-related information are sent to the information processing server 13 as integrated data (space recognition information). However, the space information and the space related information only need to be associated and may be sent to the information processing server 13 separately. Then, the sent space information and space-related information may be handled in the information processing server 13 integrally. The space recognition information may be sent to the information tag 14 in addition to the information processing server 13.

2. Construction of Terminal

Next, an embodiment of the terminal 11 will be described in detail with reference to FIG. 4.

Figure 4:
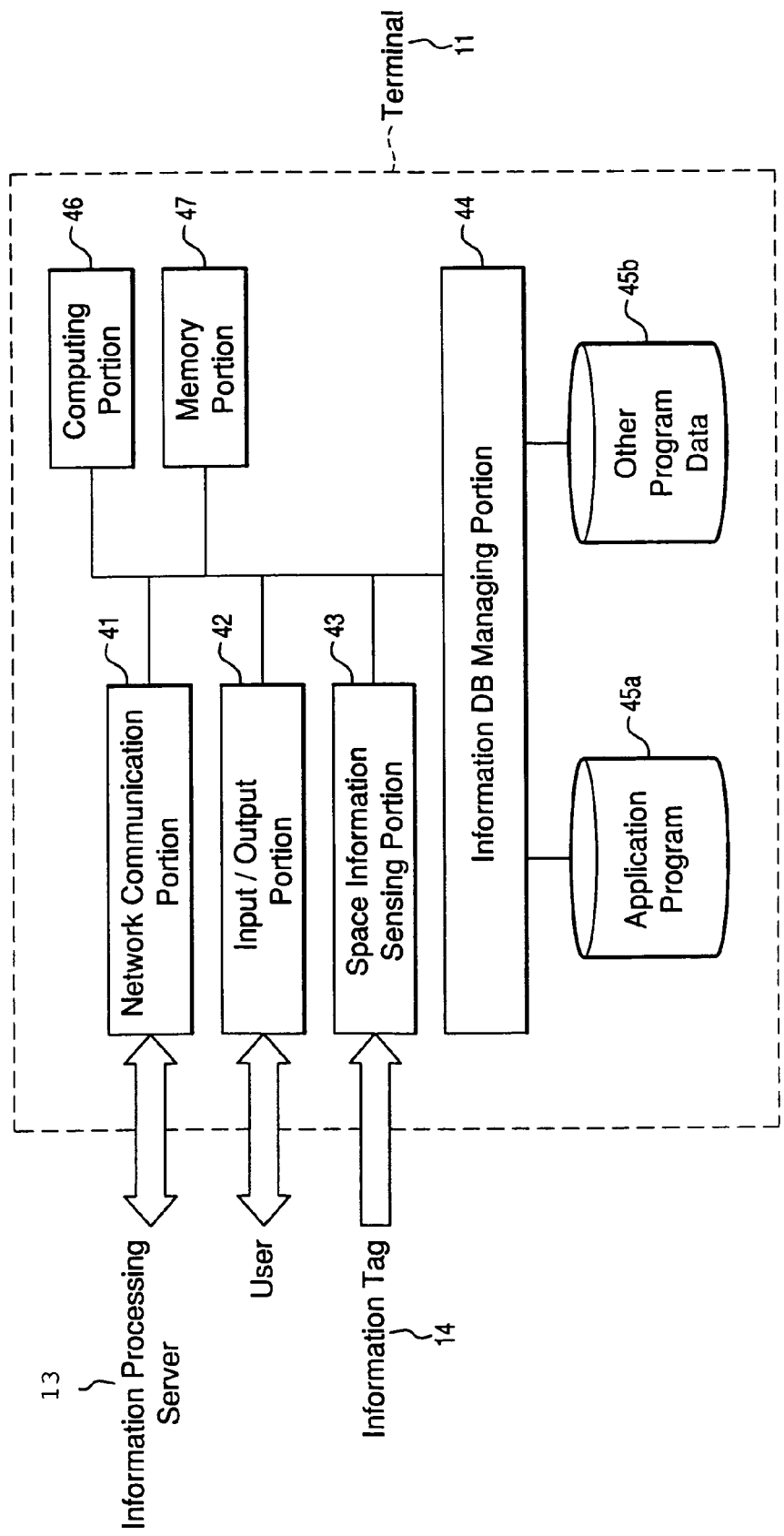
FIG. 4 is a block diagram showing a schematic construction of a terminal (information processing terminal)

As shown in FIG. 4, the terminal 11 includes a network communication portion 41 (information sending unit), input/output portion 42 (outputting unit and answer recognizing unit), a space information sensing portion 43 (inter-area movement detecting unit), an information database (DB) managing portion 44, an application program 45*a* (recording medium), other program data 45*b* (recording medium), a computing portion 46 (inter-area movement detecting unit, answer recognizing unit), a memory portion 47 (recording medium).

The network communication portion 41 is an interface for communicating information with the outside such as the information processing server 13 over the network 12 (see FIG. 2). The network communication portion 41 may be either wireless communication or wired communication in accordance with the type of the network 12. The wireless communication may use a short distance radio such as weak radio waves compliant with a wireless local area network (LAN) and/or Blue-Tooth (Registered Trademark), short distance radio such as specific small power radio, optical radio, or short-distance infrared communication. The wired communication may use a LAN or a private line.

The input/output portion 42 outputs a voice message and/or displays a message to a user in collaboration with the computing portion 46. Additionally, users use the input/output portion 42 to input answers (space-related information) from users by using a keyboard and/or switches and or a voice recognition system. Therefore, the input/output portion 42 can be implemented by a combination of a speaker, a display, a printer a microphone, a keyboard, a numeric keypad, a mouse, a voice recognition system, a barcode reader, various kinds of control devices and so on in accordance with the form of input/output information.

For example, the input/output portion 42 may output a voice message, "Where am I now?" for asking the position of the terminal 11. Alternatively, the input/output portion 42 may display a message, "Enter current position" for asking the position of the terminal 11. On the other hand, the input/output portion 42 may detect an answering voice of a user and/or may receive an input manipulation from a user.

The space-information sensing portion 43 can obtain information sent from the information tag 14 provided outside of the terminal 11. The information transmission from the information tag 14 may adopt any undulation communication forms, such as electromagnetic waves, infrared rays and ultrasound. In this embodiment, the information is transmitted by electromagnetic waves. Electromagnetic waves are generally wider in transmission range than that of infrared rays, for example. Therefore, the number of the information tags 14 provided within a specific area may be reduced and may become effective.

The information DB managing portion 44 is a logical block for controlling and managing different kinds of information obtained from the information processing server 13, users, and the information tags 14 and computing results from the computing portion 46. Additionally, the information DB managing portion 44 controls and manages an application program 45*a* and the other program data 45*b*.

The application program 45*a* and the other program data 45*b* can store different kinds of information processing programs to be executed by the terminal 11 under the control of the computing portion 46. The application program 45*a* also includes an operation system (OS). The other program data 45*b* includes different kinds of programs (for example, a calling program if the terminal 11 has a telephone function) used by users through the terminal 11 and accompanying data thereof.

Here, the application program 45*a* and the other program data 45*b* are stored in a hard disk or a semiconductor memory. However, these contents may be stored in the memory portion 47.

The computing portion 46 includes a central processing unit (CPU), for example. The computing portion 46 performs different kinds of data processing and instructs different kinds of control circuit based on the computing function. Thus, the computing portion 46 controls the terminal 11 entirely. The computing portion 46 executes the application program 45*a* and the other program data 45*b* so as to function as different kinds of function blocks.

The memory portion 47 temporarily or continuously stores computing results by the computing portion 46 and different kinds of programs and/or data. The memory portion 47 includes a volatile or non-volatile semiconductor memory, such as RAM and ROM.

Figure 5:
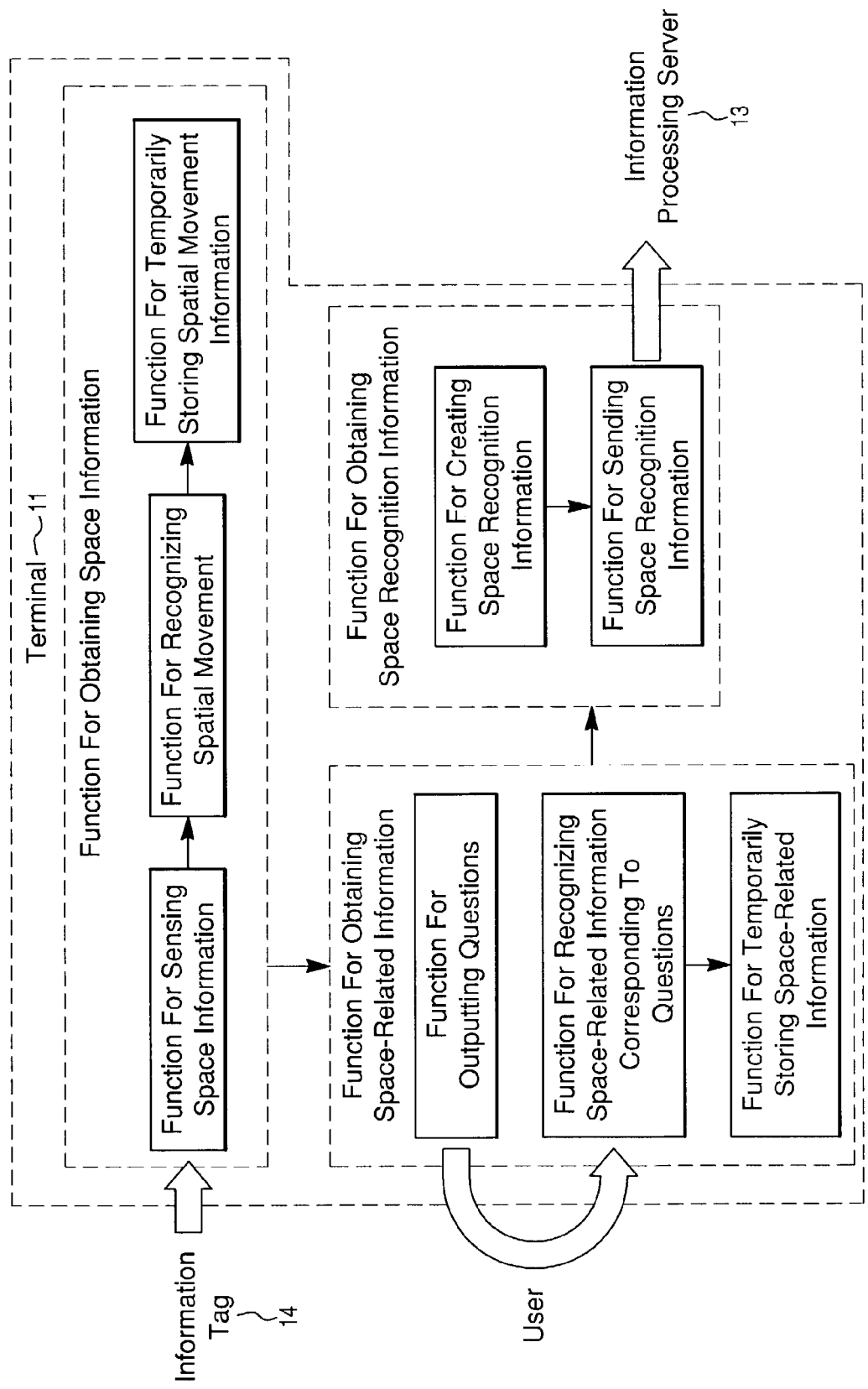
FIG. 5 is a function block diagram showing a functional construction of the terminal.

Next, for better understanding of the functions of the terminal 11, operations as function blocks by the components mainly including the computing portion 46 in the terminal 11 will be described with reference to FIG. 5. As shown in FIG. 5, the function blocks of the terminal 11 are roughly divided into (1) a function for obtaining space information, (2) a function for obtaining space-related information and (3) a function for obtaining space recognition information.

(1) Function of Obtaining Space Information

In the first function block, the terminal 11 detects space information from the information tag 14, first of all. For example, the terminal 11 approaches the information tag 14 so that positional coordinate information and/or identification number information can be sent from the information tag 14 to the terminal 11.

For example, the multiple information tags 14 are provided generally in a predetermined space. The terminal 11 obtains unique undulation information (undulations) sent from each of the information tags 14. In this case, spaces (areas) are characterized by the information tags 14, respectively. For example, each of multiple rooms sectioned and surrounded by walls for outputting unique undulations can be regarded as an "area".

The area can be identified freely in accordance with the place where each of the information tags 14 is provided. The areas to be identified may include rooms within a house (such as a kitchen and a living room), gardens, which can divide living areas of individuals, highly public spaces such as platforms in stations and predetermined areas within trains.

Then, the terminal 11 recognizes the spatial movement of the terminal 11 itself based on the detected space information. In other words, the terminal 11 detects undulations so that changes in positional relationship with each of the information tags 14 can be detected. Therefore, the terminal 11 can detect the movement of the terminal 11 itself between areas.

For example, the terminal 11 analyzes waveforms, frequencies and strength of received waves. Thus, the terminal 11 can detect an area A where the terminal 11 has a specific undulation state (including a state with no undulations) to an area B having a different undulation state. For example, the strength of an undulation received from the information tag A may be reduced more than a predetermined level (or may be lost), and the strength of an undulation received from the information tag B may be increased more than the predetermined level. In this case, the terminal 11 (actually, computing portion 46) detects that the position of the terminal 11 itself is moved from the area characterized by the information tag A to the area characterized by the information tag B.

Furthermore, the space where undulations from the multiple information tags 14 can be received may be recognized as a specific "area". For example, an area where undulations from both information tag A and information tag B can be detected may be detected as an area C.

Additionally, for example, when a line-sensor for emitting infrared rays is adopted as each of the information tags 14, the information tags A, information tag B and information tag C may be provided at the entrance of a room (area) in a house. Then, the terminal 11 detects infrared undulations from the information tag A, information tag B and information tag C. Thus, the terminal 11 can detect that the terminal 11 itself has moved from one area to the other.

At the end of this function block, the terminal 11 temporarily stores space information obtained from the information tags 14. Here, the terminal 11 detects that the position of the terminal 11 itself has moved from the area A to the area B.

(2) Function for Obtaining Space-Related Information

In the next function block, when the terminal 11 detects the spatial movement (movement between areas) of the terminal 11 itself, the terminal 11 outputs to a user a question for asking the position of the terminal 11 itself. For example, the terminal 11 may output a voice message, "Where am I now?", for asking the position of the terminal 11. Alternatively, the terminal 11 may display a message, "Enter current position" for asking the position of the terminal 11.

Then, the user answers, and the terminal 11 recognizes the contents of the answer as space-related information corresponding to questions. In this case, the user answers the question naturally from the information processing terminal even without high-level expertise and/or technical skills. Therefore, the space-related information is provided in a user-friendly tone by using general names.

Here, as a result of the recognition of the answer voice from the user, information, "You are in a living room" is recognized as space-related information. When a part (for example, a word, "living room") of the recognized space-related information is the only important part, only the important part may be extracted by using an appropriate algorithm. Then, the extracted important part may be handled as new space-related information.

At the end of this function block, the terminal 11 temporarily stores the space-related information.

(3) Function for Obtaining Space Recognition Information

In the last function block, the terminal 11 creates space recognition information by associating and integrating the obtained space information (including the fact that the terminal 11 has moved from the area A to the area B here) and space-related information (voice recognition information, "You are in a living room" here). The form of the space recognition information is not limited in particular. The space recognition information need only associate the space information and the space-related information clearly.

At the end of this function block, the terminal 11 sends the created space recognition information to the external information processing server 13.

3. Construction of Information Processing Server

Next, the construction of the information processing server 13 will be described in detail with reference to FIG. 6.

Figure 6:
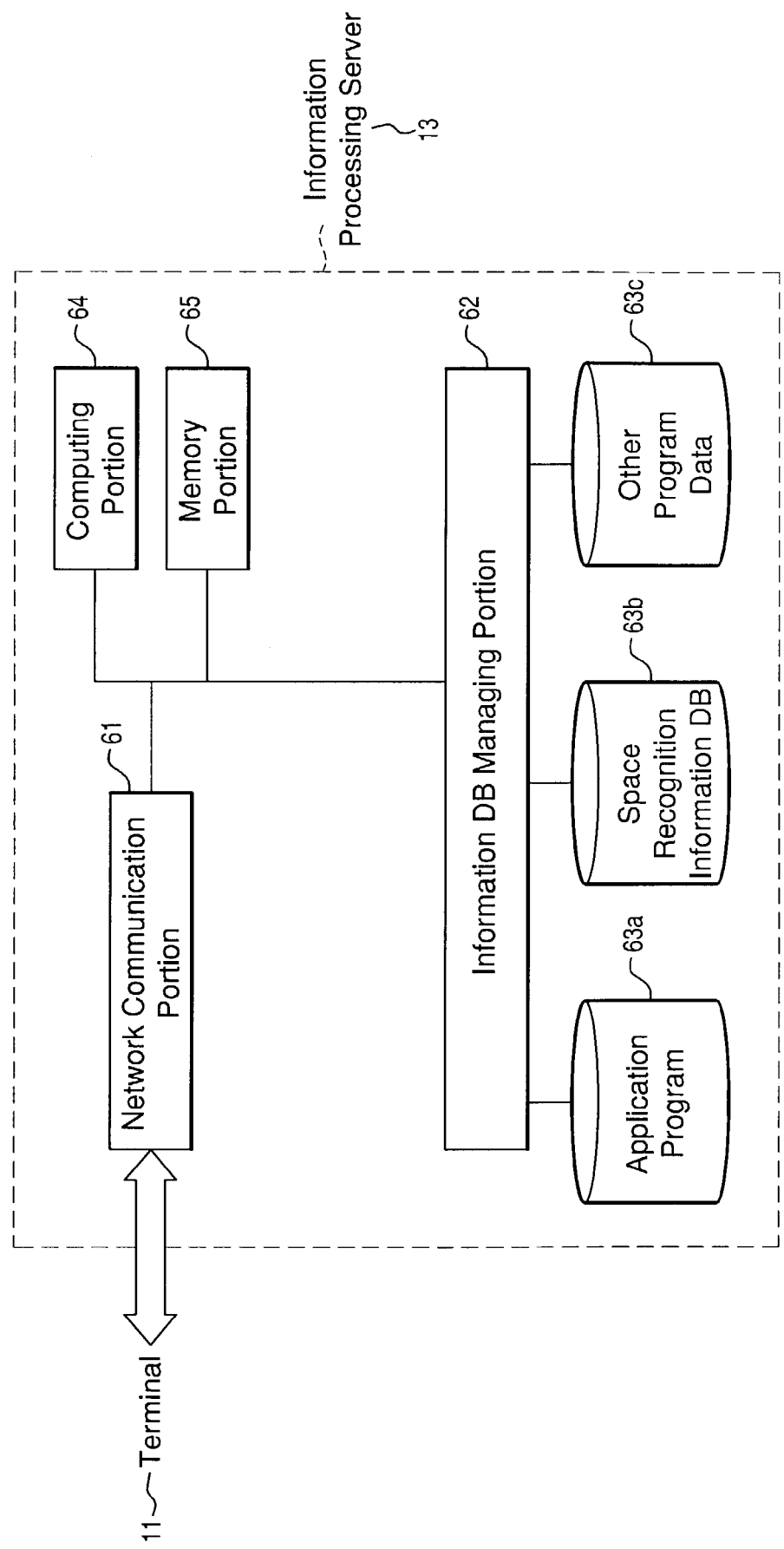
FIG. 6 is a block diagram showing a schematic construction of an information processing server (external apparatus or server)

As shown in FIG. 6, the information processing server 13 includes a network communication portion 61 (information receiving portion and information sending portion), an information database (DB) managing portion 62 (information processing portion), an application program 63*a* (recording medium), a space recognition information database (DB) 63*b* (recording medium), the other program data 63*c* (recording medium), a computing portion 64 (information processing portion), and a memory portion 65 (recording medium).

The network communication portion 61 is an interface for communicating information with the outside including the terminal 11 over the network 12 (see FIG. 2). The network communication portion 61 may be either wireless communication or wired communication in accordance with the type of the network 12. The wireless communication may use a short distance radio such as weak radio waves compliant with a wireless local area network (LAN) and/or Blue-Tooth (Registered Trademark), short distance radio such as specific small power radio, optical radio, or short-distance infrared communication. The wired communication may use a LAN or a private line.

The information database (DB) managing portion 62 is a logical block for controlling and managing different kinds of information obtained from the terminal 11 and so on and computing results from the computing portion 64. Additionally, the information DB managing portion 62 controls and manages an application program 63a, the space recognition information database (DB) 63b, and the other program data 63c.

The application program 63a, the space recognition information DB (database) 63b, and the other program data 63c can store different kinds of information processing programs to be executed by the information processing server 13 under the control of the computing portion 64.

The application program 63a also includes programs for providing users with processing information based on the space recognition information sent from the terminal 11. In addition, the application program 63a includes an operation system (OS). The space recognition information DB 63b is a database for storing the space recognition information. The other program data 63c includes application software, such as a word processor program, and a spreadsheet program to be used by an operator of the information processing server 13 and accompanying data thereof.

Here, the application program 63a, the space recognition information DB 63b and the other program data 63c are stored in a hard disk or in a semiconductor memory. However, these contents may be stored in the memory portion 65.

The computing portion 64 includes a central processing unit (CPU), for example, and executes various data processing and instruction to various control circuits. Thus, the computing portion 64 controls the information processing server 13 entirely. The computing portion 64 executes the application program 63a and the other program data 63c so as to function as different kinds of function blocks.

The memory portion 65 temporarily or continuously stores computing results by the computing portion 64 and different kinds of programs and/or data. The memory portion 65 includes a volatile or non-volatile semiconductor memory, such as a RAM and a ROM.

Figure 7:
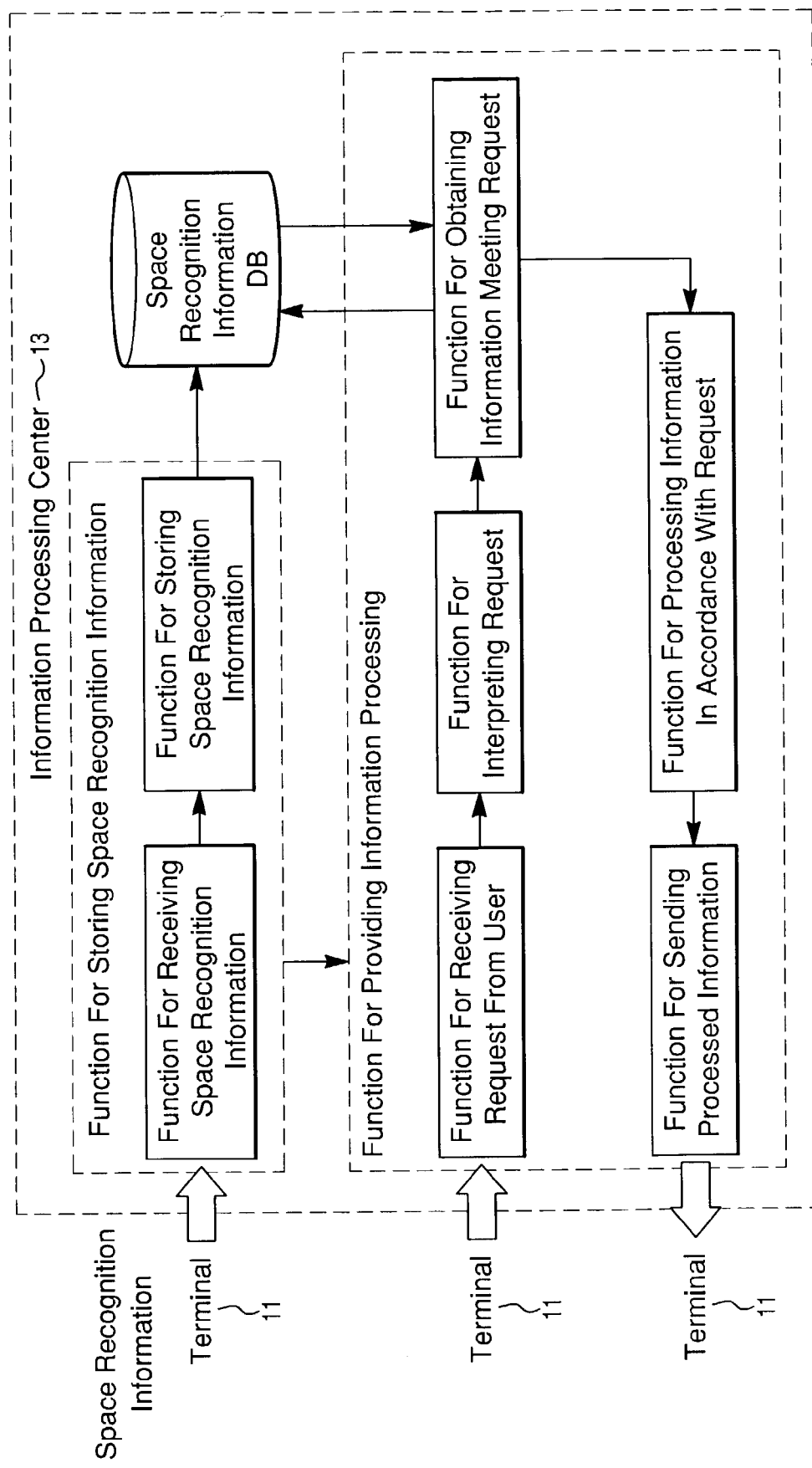
FIG. 7 is a function block diagram showing a functional construction of the information processing server.

Next, for better understanding of the functions of the information processing server 13, operations as function blocks by the components mainly including the computing portion 64 in the information processing server 13 will be described with reference to FIG. 7. As shown in FIG. 7, the information processing server 13 is roughly divided into (1) a function for storing space recognition information and (2) a function for providing information processing.

(1) Function for Storing Space Recognition Information

In the first function block, the information processing server 13 receives the space recognition information sent from the terminal 11 first of all. Then, the information processing server 13 stores the received information in the space recognition information DB 63b. By repeating the storage process, the space-recognition information DB 63b can store the space recognition information corresponding to many areas.

(2) Function for Providing Information Processing

In the next function block, the information processing server 13 receives a request and/or an instruction from a user through the terminal 11. Then, the information processing server 13 interprets the contents. Then, the information processing server 13 obtains, from the stored information in the space recognition information DB 63b, information meeting the request from the user. Then, the information processing server 13 processes the obtained information in accordance with the request and provides the processed information to the user by sending the information to the terminal 11. The construction for exchanging the request and/or the processed information between a user and the information processing server 13 is not limited to the terminal 11. An arbitrary terminal or a computer may be used.

4. An Operational Flow Example of Terminal and Information Processing Server

Next, an operational flow example of the terminal 11 and information processing server 13 will be described in time series with reference to FIGS. 8 to 11.

Figure 8:
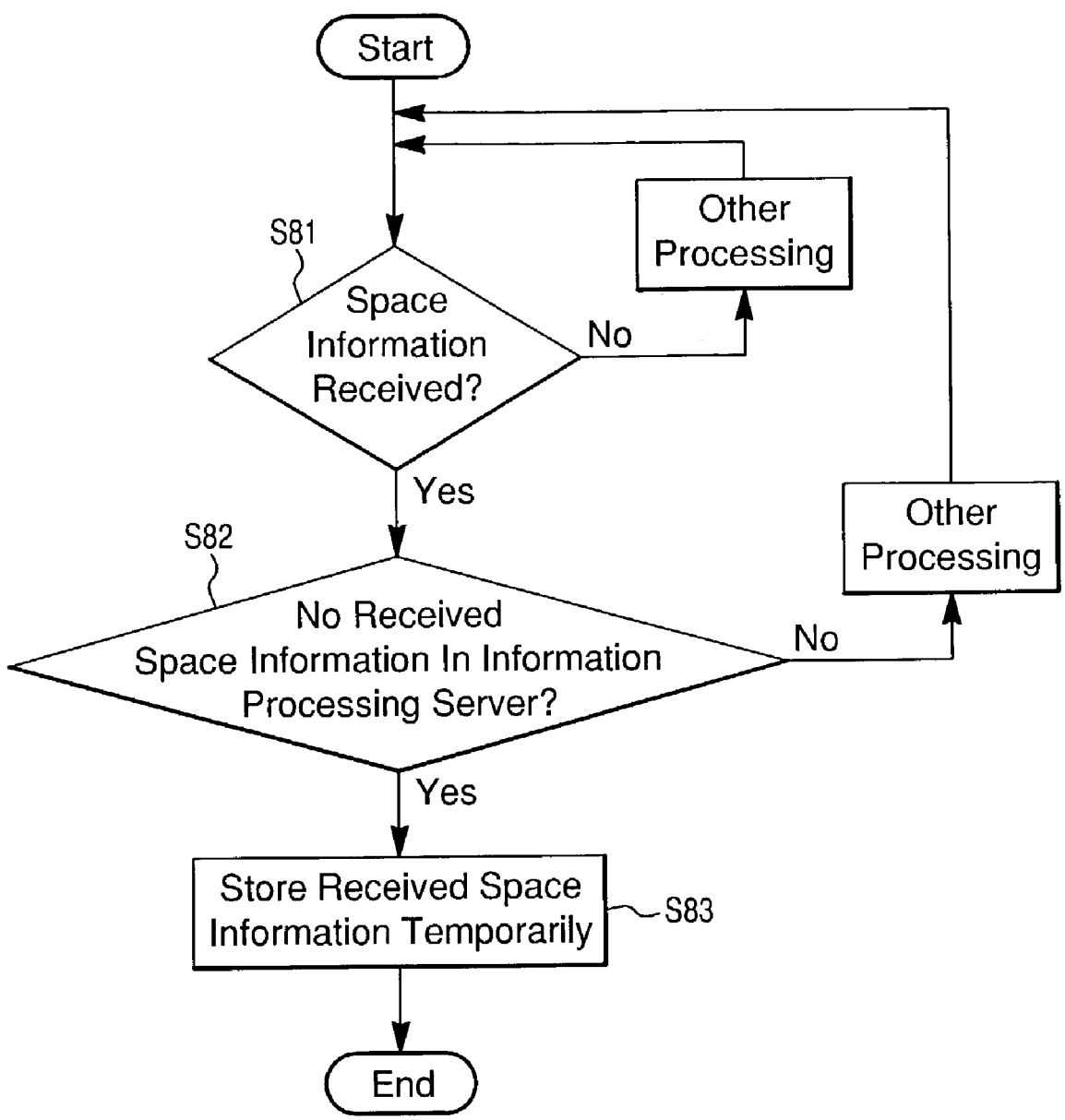
FIG. 8 is a flowchart showing an operational flow example when the terminal obtains space information.
Figure 9:
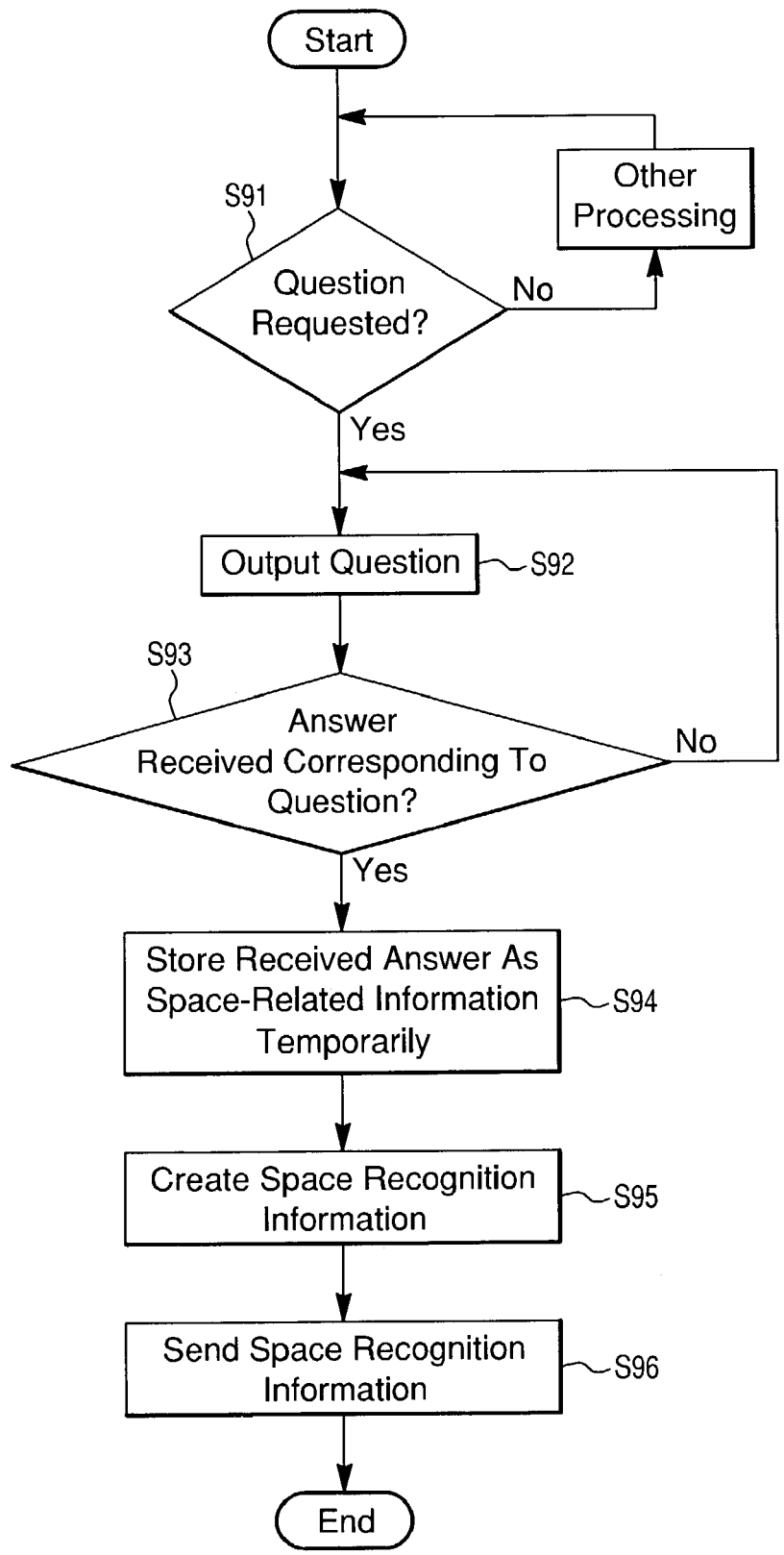
FIG. 9 is a flowchart showing an operational flow example when the terminal obtains space-related information and sends the information to the information processing server.

FIGS. 8 and 9 are flowcharts each showing an operational flow example relating to the terminal 11. FIG. 8 is an operational flow example where the terminal 11 obtains the space information. FIG. 9 is an operational flow example where the terminal 11 obtains the space-related information and sends the information to the information processing server 13.

As shown in FIG. 8, the terminal 11 determines whether or not space information is received from the information tag 14 (see FIG. 2) first of all (S81). As a result of the determination, if the space information is received (Yes), the processing goes to a next step (S82). On the other hand, if the space information is not received (No), the step S81 is repeated while the other processing is being performed.

Next, the terminal 11 checks and determines that the received space information is not in the information processing server 13. In order to determine this, the terminal 11 must communicate with the information processing server 13 in real-time or in advance. Then, the terminal 11 must recognize the registration of the space information. As a result of this check and determination, if the received space information has not been registered with the information processing server 13 yet (Yes), the processing goes to a next step (S83). On the other hand, if the received space information has been registered with the information processing server 13 already (No), the processing returns to the step S81 while the other processing is being performed. By performing this step, duplication of the data obtaining step and/or inquiries to users can be omitted for the space information having been registered with the information processing server 13 already.

At the next step (S83), the terminal 11 temporarily stores the received space information.

Then, the processing goes to the operational flow in FIG. 9. The terminal 11 determines whether or not the question is requested, that is, whether or not the movement of the terminal 11 between areas is detected based on the detection of undulations (S91). As a result of the determination, if the question is requested, that is, if the movement between areas is detected (Yes), the processing goes to a next step (S92). On the other hand, if the question is not requested, that is, if the movement between areas is not detected (No), the step S91 is repeated while the other processing is being performed.

Next, the terminal 11 outputs a question asking the position of the terminal 11 itself to the user (S92). then, the terminal 11 determines whether or not an answer corresponding to the question is received (S93). As a result of the determination, if the answer to the question is received (Yes), the processing goes to a next step (S94). On the other hand, if the answer to the question is not received (No), the processing returns to the step S92 where the question is output again.

Then, the terminal 11 recognizes the received answer and temporarily stores the contents as space-related information (S94). After that, the terminal 11 creates space recognition information based on the space information and the space-related information (S95). Then, the terminal 11 sends the created space recognition information to the information processing server 13 (S96).

Figure 10:
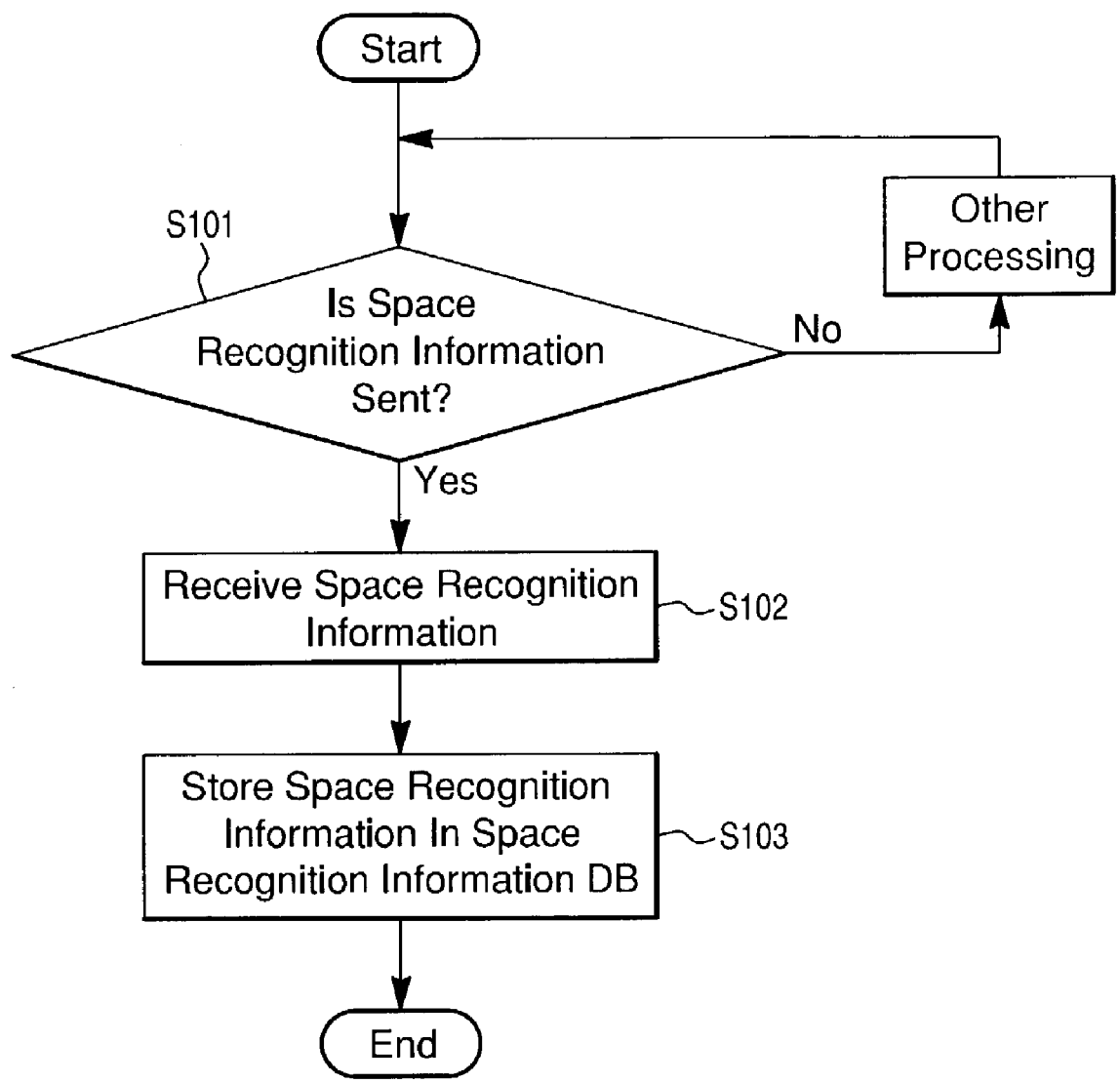
FIG. 10 is a flowchart showing an operational flow example when the information processing server obtains space recognition information.
Figure 11:
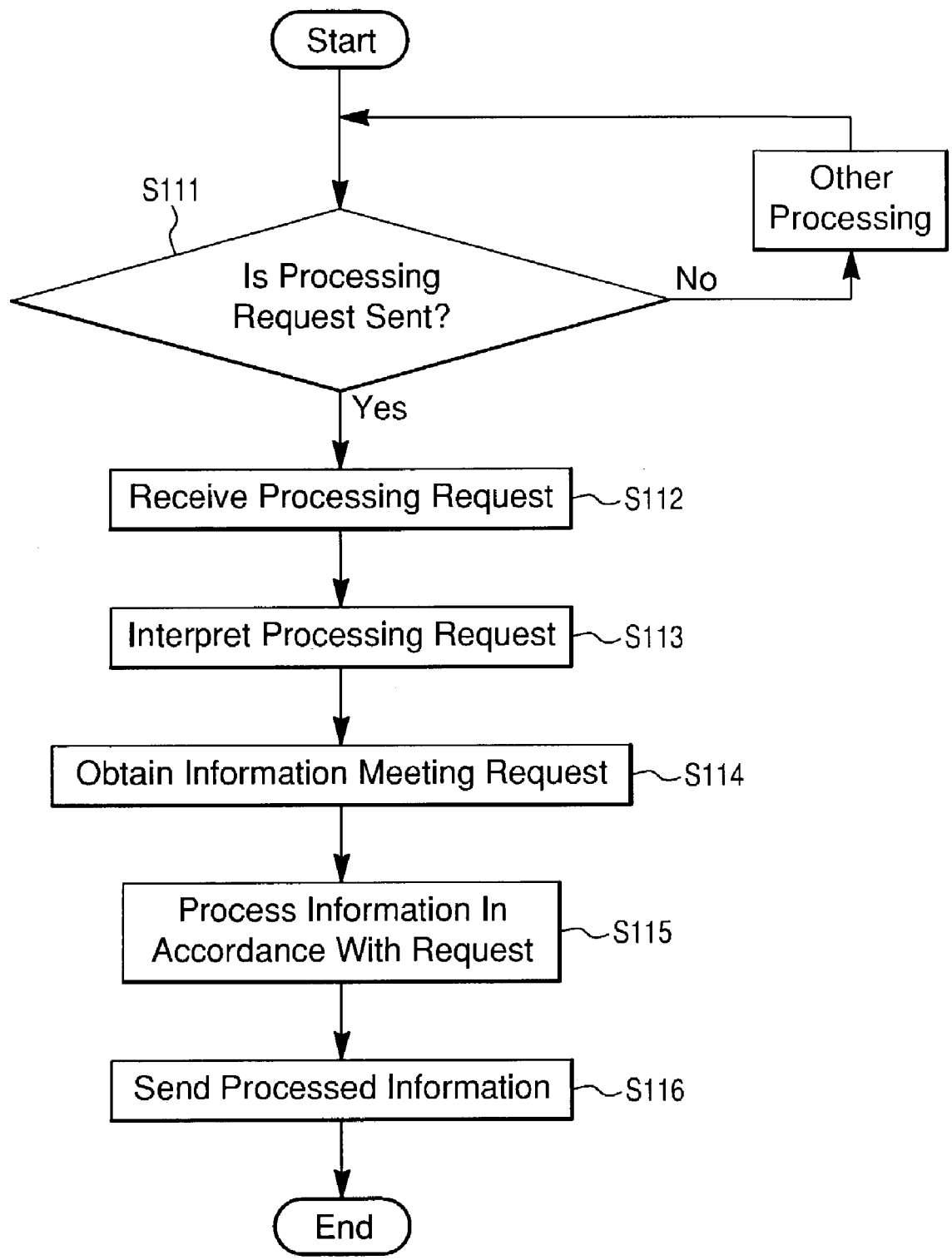
FIG. 11 is a flowchart showing an operational flow example when the information processing server provides processing information in response to a request from a user.
Figure 12:
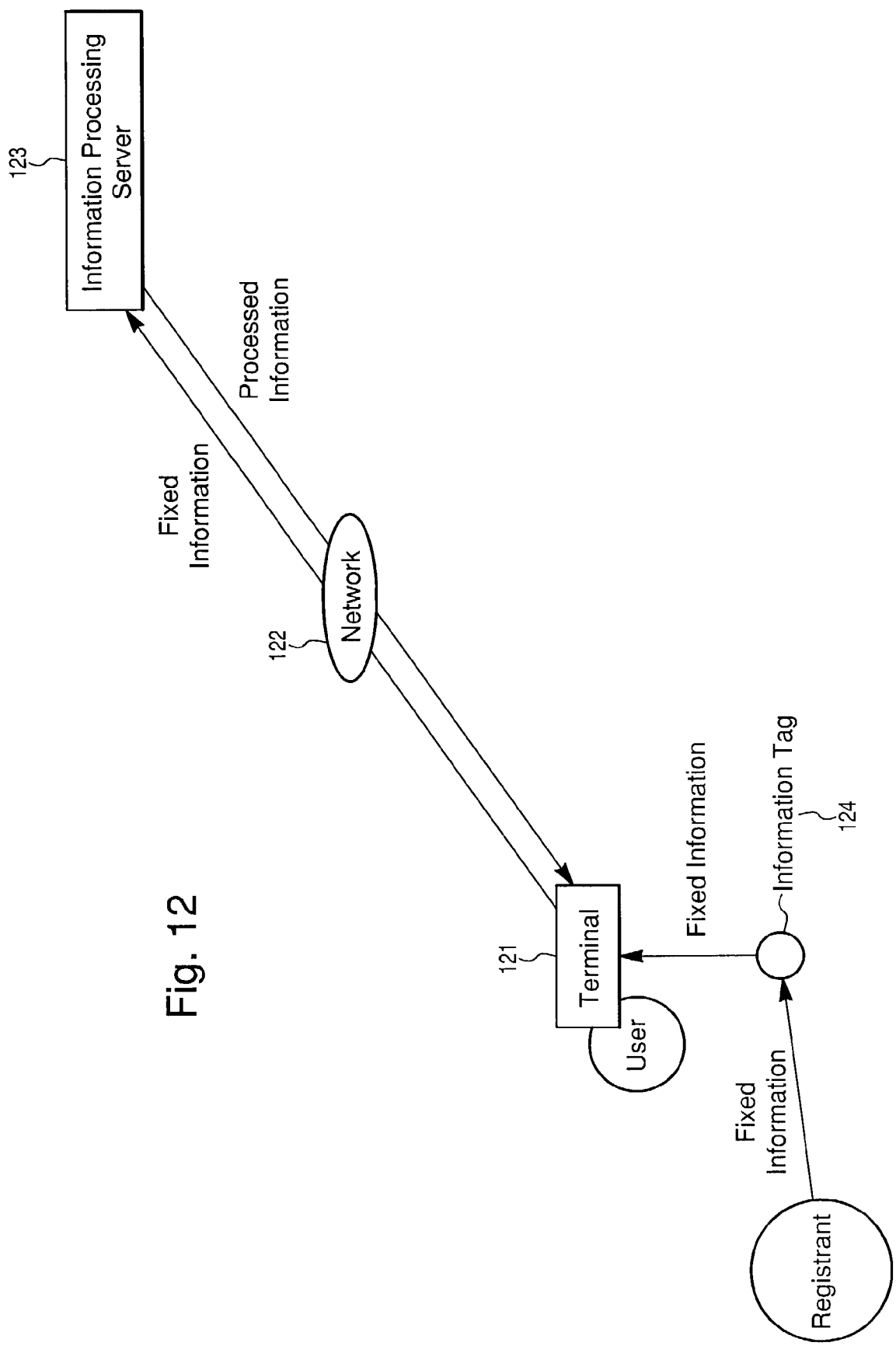
FIG. 12 is a conceptual diagram showing a construction of a conventional sensor field.

FIGS. 10 and 11 are flowcharts each showing an operational flow example relating to the information processing server 13. FIG. 10 is an operational flow example where the information processing server 13 obtains the space recognition information. FIG. 11 shows an operational flow example where the information processing server 13 provides processed information in accordance with a request from a user.

As shown in FIG. 10, the information processing server 13 determines whether or not the space recognition information is sent by the terminal 11 first of all (S101). As a result of the determination, if the space recognition information is sent (Yes), the processing goes to a next step (S102). On the other hand, if the space recognition information is not sent (No), the step S101 is repeated while the other processing is being performed.

Next, the information processing server 13 receives the contents of the sent space recognition information (S102). Then, the information processing server 13 stores the contents in the space recognition information DB 63b (see FIG. 6) (S103).

Next, in the operational flow in FIG. 11, the information processing server 13 determines whether or not a processing request is sent from the terminal 11 (S111). As a result of the determination, if the processing request is sent from the terminal 11 (Yes), the processing goes to a next step (S112). On the other hand, if a processing request is not sent from the terminal 11 (No), the step S111 is repeated while the other processing is being performed.

Then, the information processing server 13 receives the processing request (S112) and interprets the contents (S113). Then, the information processing server 13 obtains, from the space recognition information DB 63b (see FIG. 6), information meeting the processing request (S114). Then, the information processing server 13 processes the obtained information in accordance with the processing request (S115).

Finally, the information processing server 13 sends the processed information obtained at the step S115 to the terminal 11 and the user.

5. Specific Application Examples of System

The network service system according to an embodiment of the invention has been described above. Finally, specific application examples of the network service system will be described with reference to FIG. 1.

Figure 1:
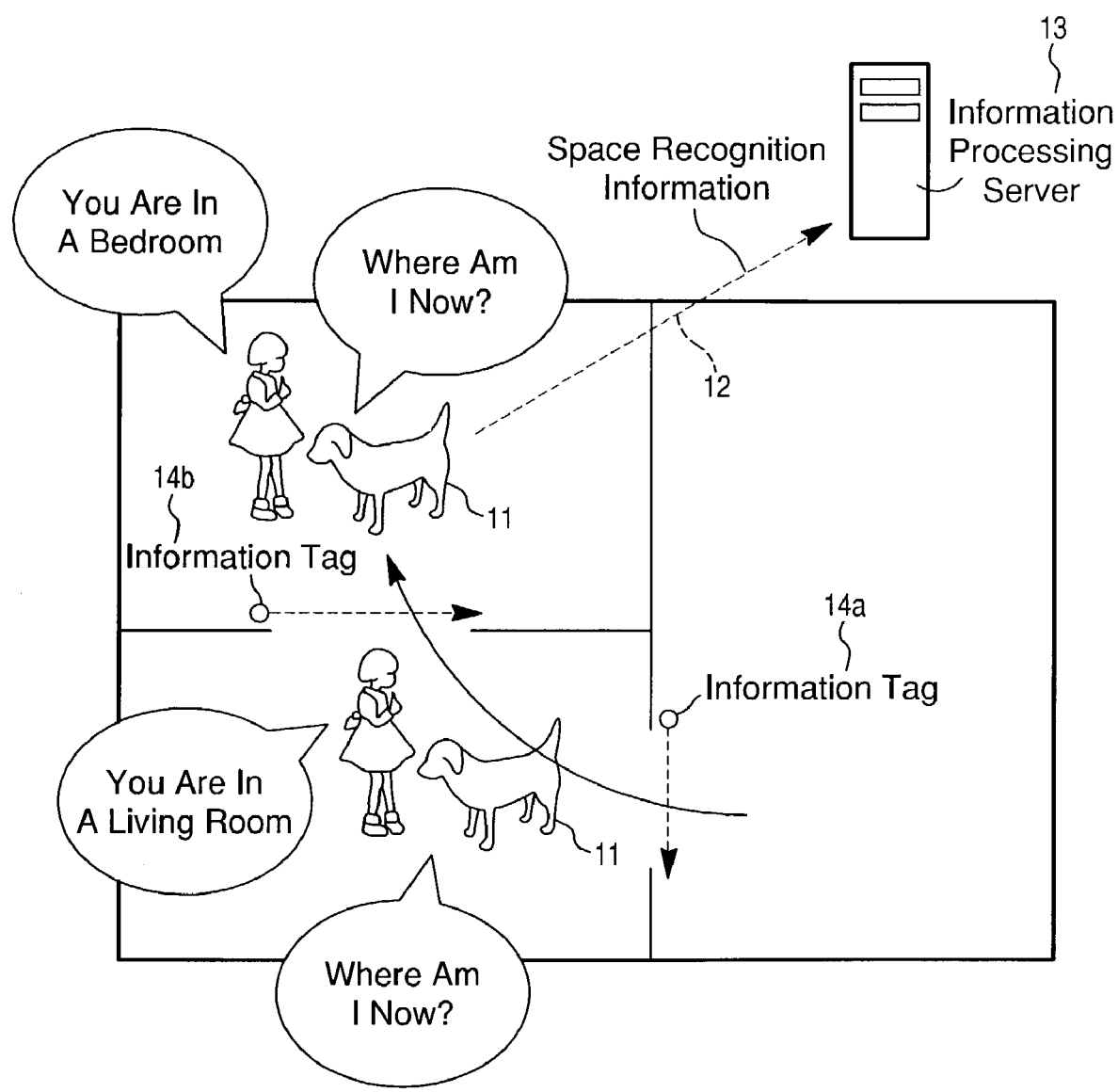
FIG. 1 is a conceptual diagram showing a specific application example of a network service system according to an embodiment of the invention.

In FIG. 1, the dog-robot type terminal 11 includes a moving device including different kinds of motor. The terminal 11 moves between rooms (areas) in a house autonomously. The terminal 11 detects undulations from the information tag 14a and the information tag 14b so as to move between the rooms and the current position in the house.

For example, when the terminal 11 crosses across an undulation from the information tag 14a, the terminal 11 detects the movement of the terminal 11 from one area to the other. The terminal 11 outputs a voice message, "Where am I now?" asking the position of the terminal to a nearby user. When the user answers "You are in a living room" to this, the terminal 11 recognizes the answer as space-related information. The space-related information is associated with the space information obtained from the information tag 14a and is sent to the information processing server 13 as the space recognition information.

In other words, the terminal 11 sends recognition information (space related information) by an answer recognizing unit and a detection result (space information) by an inter-area movement detecting unit to the information processing server 13. Thus, the information processing server 13 receives the information and can obtain information regarding the current position of the terminal 11 comprehensively. As a result, the information processing server 13 can obtain these kinds of information in association. The terminal 11 may include information regarding waveforms, frequencies and strength of detected undulations in addition to the inter-area movement information in the detection result by the inter-area movement detecting unit.

Then, when the terminal 11 crosses across an undulation from the information tag 14b, the terminal 11 detects the movement of the terminal 11 from one area to the other. The terminal 11 outputs a voice message, "Where am I now?" asking the position of the terminal 11 to a nearby user. When the user answers "You are in a bedroom" to this, the terminal 11 recognizes the answer as space-related information. The space-related information is associated with the space information obtained from the information tag 14b and is sent to the information processing server 13 as the space recognition information.

In this way, voice is output to a user and/or a voice answer from a user is recognized so that the users can answer in an extremely natural form. Therefore, users can provide space-related information easily in a friendly tone by using general names. As a result, for example, small children can use the present information processing terminal.

As described above, a user can provide space-related information (such as names and/or nicknames of areas) corresponding to the current position to information processing server 13 only by answering to questions from the terminal 11 naturally without expertise and/or technical skills. Therefore, the information processing server 13 does not have to impose special system loads. The information processing server 13 only needs to receive and store, in the space recognition information DB 63b (see FIG. 6), information transmitted from the terminal 11. Thus, the information processing server 13 can store space recognition information.

The terminal 11 and the information processing server 13 recognize natural answers from users to questions so that space-related information can be obtained in a user-friendly tone by using general names, for example. After that, the information processing server 13 can guide evacuation in emergency by using area names familiar to users based on the space-related information. Therefore, more effective network service can be provided.

One embodiment of the invention has been described above as the information processing terminal (terminal 11)

and the server (information processing server 13) including the functional blocks. Another aspect of the invention is an information processing method including an inter-area movement detecting step for detecting that a position of an information processing terminal is moved from one area to the other by detecting an undulation, an outputting step for outputting a question asking the position of the information processing terminal to a user in response to the detection by the inter-area movement detecting step, an answer recognizing step for recognizing an answer by the user to the question output at the outputting step and an information sending step for sending the information recognized at the answer recognizing step to an external apparatus.

An information processing program for implementing the function blocks of the information processing terminal (terminal 11) and server (information processing server 13) can be provided to the information processing terminal and the server through various kinds of computer-readable program medium (recording medium) and the drivers in addition to the application program 45*a* and other program data 45*b* for the terminal 11 and the application program 63*a*, space recognition information database (DB) 63*b* and other program data 63*c* for the information processing server 13.

The program medium is a recording medium removably attached to a body. The program medium may be a medium regularly holding programs including a tape system such as a magnetic tape and a cassette tape, a magnetic disk such as a floppy disk and a hard disk, an optical disk system such as a CD-ROM, an MO, an MD and a DVD, a card system such as an IC card (including a memory card), and an optical card, and a semiconductor memory such as a mask ROM, an EPROM, an EEPROM and a flash ROM.

The information processing program may be downloaded to the information processing terminal and the server over a communication network including the Internet. In order to download the information processing program from the communication network, the program for download may be stored in the information processing terminal and/or in the server in advance. Alternatively, the program for download may be installed from a separate recording medium. The contents to be stored in a recording medium is not limited to a program and may be data.

What is claimed is:

1. An information processing terminal, comprising:
    inter-area movement detecting means for detecting that a position of the information processing terminal is moved from one area to another area by detecting undulations with respect to signals respectively received from a plurality of information tags positioned at predetermined positions within a region having a plurality of sub-regions each corresponding to an area covered by a respective one of the plurality of information tags;
    outputting means for outputting a question to a user asking the position of the information processing terminal in response to the detection of inter-area movement by the inter-area movement detecting means;
    answer recognizing means for recognizing an answer by the user in response to the question output by the outputting means; and
    information sending means for sending information recognized by the answer recognizing means to an external apparatus.

2. An information processing terminal according to claim 1, wherein the information sending means sends a detection result by the inter-area movement detecting means to the external apparatus in addition to the information recognized by the answer recognizing means.

3. An information processing terminal according to claim 1, wherein the outputting means outputs voice.

4. An information processing terminal according to claim 1, wherein the answer recognizing means recognizes voice.

5. An information processing terminal according to claim 1, wherein the undulations are electromagnetic waves.

6. An information processing terminal according to claim 1, further comprising moving means for moving from the one area to the another area.

7. A server, comprising:
    an information receiving portion for receiving information sent from the information processing terminal according to claim 1;
    an information processing portion for processing information received by the information receiving portion; and
    an information sending portion for sending information processed by the information processing portion to the terminal.

8. An information processing terminal, comprising:
    an inter-area movement detecting unit for detecting that a position of the information processing terminal is moved from one area to another area by detecting undulations with respect to signals respectively received from a plurality of information tags positioned at predetermined positions within a region having a plurality of sub-regions each corresponding to an area covered by a respective one of the plurality of information tags;
    an outputting unit for outputting a question to a user asking the position of the information processing terminal in response to the detection of inter-area movement by the inter-area movement detecting unit;
    an answer recognizing unit for recognizing an answer by the user in response to the question output by the outputting unit; and
    an information sending unit for sending information recognized by the answer recognizing unit to an external apparatus.

9. An information processing terminal according to claim 8, wherein the information sending unit sends a detection result by the inter-area movement detecting unit to the external apparatus in addition to the information recognized by the answer recognizing unit.

10. An information processing terminal according to claim 8, wherein the outputting unit outputs voice.

11. An information processing terminal according to claim 8, wherein the answer recognizing unit recognizes voice.

12. An information processing terminal according to claim 8, wherein the undulations are electromagnetic waves.

13. An information processing terminal according to claim 8, further comprising a moving unit for moving from the one area to the another area.

14. An information processing program, wherein a computer is arranged to function as an information processing terminal according to claim 1.

15. An information processing program, wherein a computer is arranged to function as a server according to claim 7.

16. A computer-readable recording medium for recording an information processing program according to claim 8.

17. An information processing method, comprising:
    detecting that a position of an information processing terminal is moved from one area to another area by detecting undulations with respect to signals respectively received from a plurality of information tags positioned at predetermined positions within a region having a plurality of sub-regions each corresponding to an area covered by a respective one of the plurality of information tags;

outputting a question to a user asking the position of the information processing terminal in response to the detecting step;

recognizing an answer by the user in response to the question output in the outputting a question step; and sending information recognized at the recognizing an answer step to an external apparatus.

18. A computer-readable program medium for performing a method of information processing, the computer program product including a plurality of computer executable instructions stored on a computer-readable medium, wherein the instructions, when executed by the computer, cause the computer to perform the steps of:

detecting that a position of an information processing terminal is moved from one area to another area by detecting undulations with respect to signals respectively received from a plurality of information tags positioned at predetermined positions within a region having a plurality of sub-regions each corresponding to an area covered by a respective one of the plurality of information tags;

outputting a question asking the position of the information processing terminal to a user in response to the detecting step;

recognizing an answer by the user in response to the question output in the outputting a question step; and sending information recognized at the recognizing an answer step to an external apparatus.

19. The computer readable program medium of claim 18, wherein the instructions, when executed by the computer, cause the computer to perform the further steps of:

receiving information sent from the information processing terminal;

processing information received in the receiving information step; and sending information processed in the processing information step to the terminal.

20. An information processing terminal according to claim 1, wherein the inter-area movement detecting detects that a position of the information processing terminal is moved from one area to another area by detecting an increase or decrease in signal strength of first and second signals respectively output by first and second information tags provided at first and second sub-regions, wherein the first sub-region corresponds to the one area and the second sub-region corresponds to the another area.

* * * * *